US008054999B2

(12) United States Patent
Rasmussen

(10) Patent No.: US 8,054,999 B2
(45) Date of Patent: Nov. 8, 2011

(54) AUDIO SYSTEM WITH VARYING TIME DELAY AND METHOD FOR PROCESSING AUDIO SIGNALS

(75) Inventor: Karsten Bo Rasmussen, Smørum (DK)

(73) Assignee: Oticon A/S, Smorum (DK)

( * ) Notice: Subject to any disclaimer, the term of this patent is extended or adjusted under 35 U.S.C. 154(b) by 1358 days.

(21) Appl. No.: 11/640,958

(22) Filed: Dec. 19, 2006

(65) Prior Publication Data

US 2007/0173962 A1 Jul. 26, 2007

(30) Foreign Application Priority Data

Dec. 20, 2005 (EP) .................................... 05112449

(51) Int. Cl.
*H04R 25/00* (2006.01)
*G06F 17/00* (2006.01)

(52) U.S. Cl. .......................... 381/312; 381/314; 700/94

(58) Field of Classification Search .................. 381/312, 381/317, 318, 316
See application file for complete search history.

(56) References Cited

U.S. PATENT DOCUMENTS 6,912,289 B2 * 6/2005 Vonlanthen et al. .......... 381/312
7,181,033 B2 * 2/2007 Fischer et al. ................ 381/317
2002/0037087 A1 * 3/2002 Allegro et al. ................ 381/317
2002/0122562 A1 * 9/2002 Brennan et al. ............... 381/316
2006/0083386 A1 * 4/2006 Allegro-Baumann et al. . 381/60

FOREIGN PATENT DOCUMENTS

EP 1 513 371 A 3/2005

OTHER PUBLICATIONS

Kovacshazy et al., Proceedings of the 17th IEEE Instrumentation and Measurement Technology Conference, vol. 1, 2000, pp. 241-246.

* cited by examiner

*Primary Examiner* — Curtis Kuntz
*Assistant Examiner* — Sunita Joshi
(74) *Attorney, Agent, or Firm* — Birch, Stewart, Kolasch & Birch, LLP

(57) ABSTRACT

The invention regards a method for processing audio signals whereby an audio signal is captured, digitized and processed in the digital domain by a digital signal processing unit or DSP, and where a processed output signal from the digital signal processing unit is converted to the analog domain and served at a transducer for providing a sensation of sound. The DSP unit is provided with mean for performing at least two different digital algorithms which delivers each their processed signal having each their non identical time delay and further the most rewarding sound signal is chosen and served at the output transducer.

8 Claims, 3 Drawing Sheets

AUDIO SYSTEM WITH VARYING TIME DELAY AND METHOD FOR PROCESSING AUDIO SIGNALS

AREA OF THE INVENTION

The invention regards audio systems as used in hearing aids, headsets and other devices wherein an environmental audio signal is processed and continually served at one or more listeners.

BACKGROUND OF THE INVENTION

It is well documented that the delay, introduced by digital processing in modern audio systems, can lead to a range of disturbing effects experienced by the user. The processing delay should in general be lower than 10 milliseconds. This time is based on average ratings and rather large deviations exist depending on degree of: amplification, incoming sound signal, type of sound processing and individual differences between people. The range of acceptable values may be roughly 3 to 40 milliseconds depending on such factors.

While a short delay is desirable in order to limit the disturbing effects experienced by the user, (poor sound quality, difficulty in locating direction of sound source) when a short delay is specified it severely limits the processing capabilities of a given audio system.

Hence, the more advanced processing used in the system, the longer the delay will inevitably be. One example is noise reduction oriented processing which is often based on block processing, and if the system is only allowed to impose a short delay, only very limited block length can be used leading to poorer performance.

In state of the art audio systems a certain fixed processing delay is imposed. This delay is a compromise between the risk of subjectively experienced problems and the processing capabilities.

In connection with audio devices of the hearing aid type there has been a trend in recent years towards more open hearing aids, i.e. instruments with large vent diameters. Such open instruments may be particularly sensitive to the delay introduced by the audio processing. At the same time there is a push for more time consuming signal processing features enhancing the wanted signal (typically a speech signal).

According to the disclosure of US 20020122562 A1, there exists many possible tradeoffs between the number of bands, the quality of the bands, filterbank delay and power consumption. In general, increasing the number or quality of the filterbank bands leads to increased delay and power usage. For a fixed delay, the number of bands and quality of bands are inversely related to each other. On one hand, 128 channels would be desirable for flexible frequency adaptation for products that can tolerate a higher delay. The larger number of bands is necessary for the best results with noise reduction and feedback reduction algorithms. On the other hand, 16 high-quality channels would be more suitable for extreme frequency response manipulation. Although the number of bands is reduced, the interaction between bands can be much lower than in the 128 channel design. This feature is necessary in products designed to fit precipitous hearing losses or other types of hearing losses where the filterbank gains vary over a wide dynamic range with respect to each other. In accordance with the invention presented in the US 20020122562 document, the filterbanks provide a number of bands, which is a programmable parameter.

The US document does not allow the change of processing time to be performed on-line during processing, but solely mentions the possibility to program a certain delay or frequency resolution prior to the use of the audio device. Thus the user will have to live with this programmed setting, even if the audio environment changes and changes in processing in terms of more time delay and more complex processing would suddenly be advantageous.

The invention provides a method of audio processing and an audio device which offers a solution to this problem.

SUMMARY OF THE INVENTION

According to the invention a method for processing audio signals is proposed whereby an audio signal is captured, digitized and processed in the digital domain by a digital signal processing unit or DSP, and where a processed output signal from the digital signal processing unit is adapted to a transducer and served at the transducer for providing a sensation of sound. At least two different digital algorithms are available within the digital processing unit which delivers each their processed signal having each their non identical time delay and the algorithm or output signal from the algorithm which provides the most rewarding sound signal for the user is automatically chosen.

Thus a method for processing an audio signal is proposed, wherein the time delay is varied as a function of time during audio processing.

Hence, a hearing aid system which makes use of the method according to the invention can vary the delay in steps (or continuously) in addition to the well known variations such as fast anti-feedback and slow anti-feedback, detection of speech or absence of speech, etc. A short delay may for instance be desirable when a high speech to noise ratio is present, whereas a long delay may be useful for the hearing impaired in situations where a high background noise level is present and where noise reduction oriented processing is imperative. A long delay could also be desirable in cases where the demands on the anti-feedback system are unusually high, since a large throughput delay makes it possible to increase the performance of the anti-feedback system.

When the invention is used in connection with a hearing aid system the left and right hearing aids should have their delays synchronized by means of a communication link between the hearing aids.

In an embodiment of the invention the input signal is initially analysed and based on results thereof a choice is made as to which algorithm and accompanying time delay should be performed in order to provide the most rewarding output signal for the user, whereby an according decision signal from an analyse block is served at the DSP unit in order to realize the chosen algorithm. In this way, when no change of time delay or processing algorithm is being performed, the DSP unit will only perform one of the possible algorithms, and this will aid to save power. This is most important in portable systems like hearing aids and headsets.

In a further embodiment, the input signal is analysed in the DSP unit, and at least two processing algorithms are performed on the input signal, and the possible effect of the different algorithms in terms of user benefit is assessed and the effect of the time delay of each algorithm is taken in account in order to determine which algorithm will provide the most rewarding processed signal, and a corresponding decision signal is served at a decision box in order to choose the corresponding output from the processing algorithm. When this embodiment is realized the signal produced by each of the different algorithms will be available immediately when desired as output and also the effect of the performed algorithm may be analysed on the resulting output signal.

According to an embodiment of the invention a time alignment between a current processed signal and a desired processed signal is provided by introducing a time delay in the processed signal having the smallest time delay of the two whereafter fading from a current signal to a desired signals is performed. In this way it becomes possible to change from the output of algorithms with different time delay without audible side effects.

In a further embodiment the time delay of the just chosen desired signal is reduced as much as possible. Hereby it is assured that the signal provided for the user always has as small a time delay as possible.

According to the invention an audio system is also provided, comprising means for capturing an audio signal, means for digitizing the audio signal and a digital signal processing unit or DSP for processing in the digital domain of the audio signal. A processed output signal from the DSP unit is adapted to a transducer and served at the output transducer for providing a sensation of sound. The DSP unit is provided with means for performing at least two different digital algorithms which delivers each their processed signal having each their non identical time delay and further means are provided for choosing the most rewarding sound signal for the user. Such a system is capable of performing automatic choice of audio processing algorithm whereby the delay realized by the chosen algorithm is reflected in the output signal and where the choice is performed based on time delay which is tolerable under the given circumstances.

DESCRIPTION OF A PREFERRED EMBODIMENT

Figure 1:
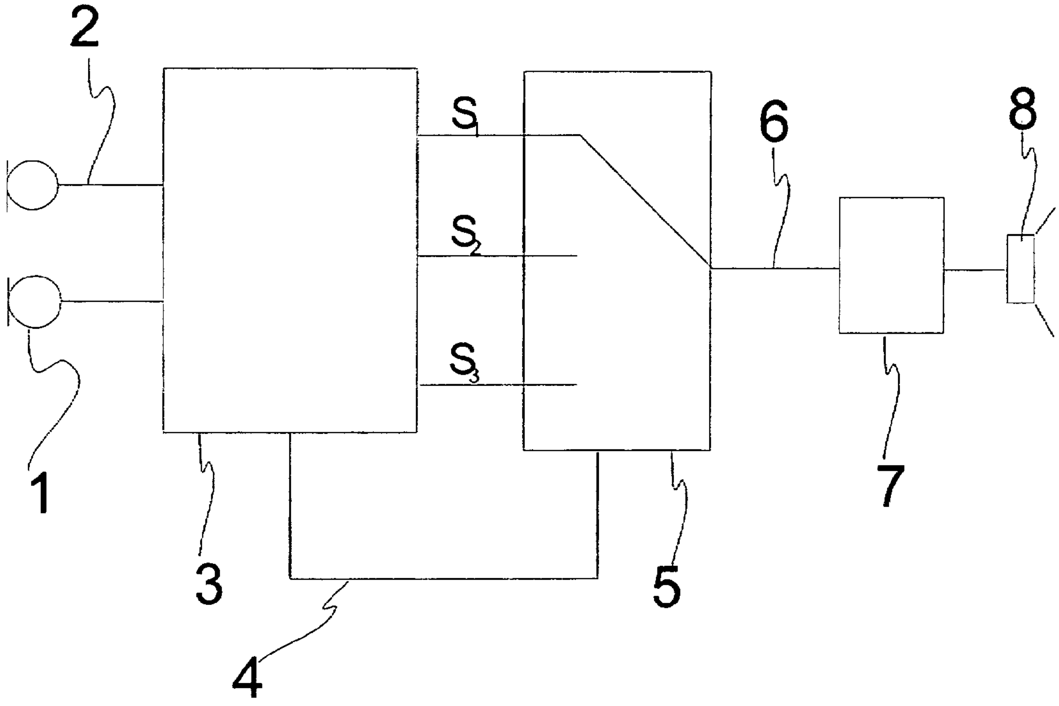
FIG. 1 shows a schematic diagram of a hearing aid according to an aspect of the invention.

FIG. 1 illustrates a simplified example of a hearing aid which embodies an example of the method according to the invention. A diagram of the signal path in a hearing aid is shown, whereby one or more microphones 1 are arranged to pick up environmental sounds. In the hearing aid other sound signals may be transmitted through the signal path, such as telecoil signals or other wireless or wired audio signal as well known in conventional hearing aids. The incoming signals 2 are digitized in the usual way (not shown in the figure) and routed to a digital signal processing unit (DSP) 3. Here a usual amplification and noise damping process is performed on the incoming signal as is usual in hearing aids. The method according to the invention allows two or more different algorithms to be performed on the audio signal in the DSP unit and thus delivering two or more output signals, illustrated in FIG. 1 by $S_1$, $S_2$ and $S_3$. The algorithms have each their time delay $Dt_1$, $Dt_2$ and $Dt_3$ as displayed in FIG. 2.

Further the DSP unit will analyze the input signal 2 in order to determine which of the output signals $S_1$, $S_2$ and $S_3$ will provide the most rewarding signal for the user. The result of this is a control signal 4, which will determine which of the signals $S_1$, $S_2$ and $S_3$ are to be presented to the user. In order to provide the control signal 4 various signal parameters are determined and compared, and based on the size of the parameters a choice of output signal is performed. Here it is worth noticing that the choice is made as a compromise which balances the harming effects of long delays and the benefits of extensive signal processing. If a short time delay is wished, a simple or reduced signal processing is performed in the DSP unit, and in cases where longer time delays may be tolerated, a more complex algorithm may be employed which may provide other advantages, outbalancing the drawback of the longer time delay.

The control signal 4 is served at a choice box 5 wherein the choice of output signal is performed. In FIG. 1 it is shown as if a simple switch is used to choose between the presented output signals, but such a solution will cause very annoying side effects for the user, and is thus not very useful in real life, but it is shown for illustrative purposes. The chosen output signal 6 is routed to an output stage 7 wherein among other the signal is adapted to the output transducer 8.

Finally the signal is served at the output transducer 8 which feeds an output signal to the user in a form perceivable as sound. In a conventional hearing aid this would be a speaker 8, and in cochlear implants an electrode provides the output in the form of electrical signals to the cochlear of the user.

Figure 2:
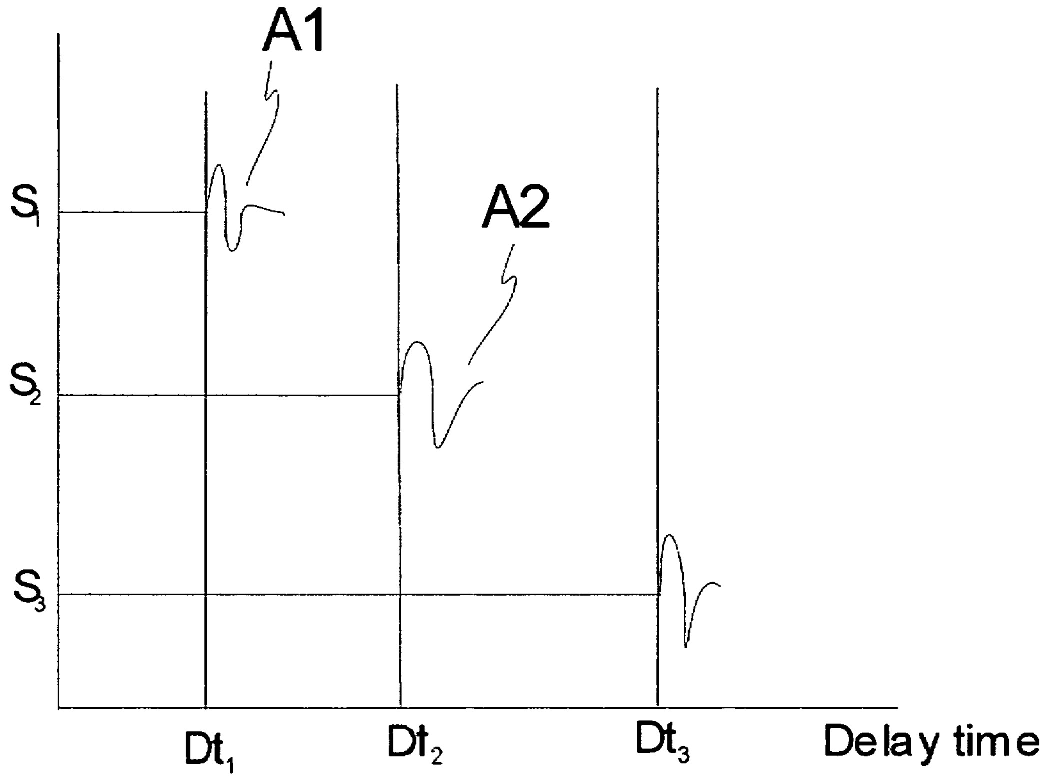
FIG. 2 shows the time delays of various signals processing algorithms.

A more realistic way of performing the choice when using a hearing aid processing system employing different throughput delay time is presented in the following with reference to FIG. 2.

When the delay is changing from a longer to a shorter delay eg changing from the signal $S_2$ to the signal $S_1$ the data stream will be affected by a data loss representing the time difference between $Dt_2$ and $Dt_1$. As illustrated in FIG. 2 an audio event will result in a signal event A1 representative thereof in $S_1$ which will arrive at choice box 5 $Dt_1$ milliseconds after the signal reached the microphones 1. The same audio event will result in a signal event A2 representative thereof in $S_2$ which will arrive at choice box 5 $Dt_2$ milliseconds after the audio signal reached the microphones 1. The signal events A1 and A2 will represent the same audio event, but will be processed according to each their algorithm in the DSP unit 3. The time difference between $Dt_1$ and $Dt_2$ could be in the range of 10 to 4 milliseconds. During a suitable time window, which as an example could be in the order of 5-10 milliseconds both $S_2$ and $S_1$ will generate output data and the data which are fed to the receiver of the hearing aid will be calculated as an interpolation between the two signals in order to avoid clicks or other artefacts. At the beginning of the aforementioned time window the receiver signal is based on the long delay signal $S_2$, and this is gradually changed so that at the end of the time window, the receiver signal is based on the $S_1$ signal with the short delay $Dt_1$.

When the delay is changing from a longer delay to a shorter delay as when a shift from signal $S_2$ to signal $S_1$ is performed, a possible first step is to delay the signal $S_1$, the delay being equal to the time difference between $Dt_1$ and $Dt_2$, such that the delayed $S_1$ signal has the delay time of the signal $S_2$ namely $Dt_2$. This will ensure that the $S_1$ and $S_2$ signals are aligned with respect to time. After this the next step is to interpolate between the $S_2$ signal and the delayed version of the $S_1$ signal. This interpolation provides a smooth change between synchronous signals based on two different processing schemes each associated with the respective processing delays of $Dt_1$ and $Dt_2$. This interpolation takes place in a time frame which could be in the range between 1 and 30 milliseconds. As a second step the output signal 6 is changed from the delayed version of the $S_1$ signal and to the $S_1$ signal itself. This is done through a transition time which could be 0.2 milliseconds during which the delayed $S_1$ signal is gradually attenuated and the $S_1$ signal is gradually increased in amplitude from almost zero and until the specified value is reached.

An alternative way to shift the output signal 6 from the $S_1$ to the $S_2$ is described in the following. Such a shift results in a shift from a signal with a shorter delay $Dt_1$ to a signal with a longer delay $Dt_2$ and a possible first step could be to change from the $S_1$ signal and to a delayed version of the $S_1$ signal—the delay being equal to the time difference between $S_1$ and $S_2$ signals. This could be in the range from 4 to 6 milliseconds.

This is done through a transition time which could be 0.2 milliseconds during which the $S_1$ signal is gradually attenuated and the delayed version of the $S_1$ signal is gradually increased in amplitude from almost zero and until the specified value is reached. The second step is that an interpolation between the $S_2$ signal and a delayed version of the $S_1$ signal is performed. This interpolation provides a smooth change between synchronous signals based on two different processing schemes each associated with the respective processing delay of $Dt_1$ and $Dt_2$. This interpolation takes place in a time frame which could be 3 milliseconds.

The signal transitions according to the present invention may be postponed until a time where only a weak input signal is present in the input line 2. In this way the possibility of audible artefacts may be reduced.

The signal transitions according to the present invention may be postponed until a time where a weak signal is present immediately after a strong signal. In this way the possibility of audible artefacts may be further reduced through time domain masking effects known to be present in human hearing.

Figure 3:
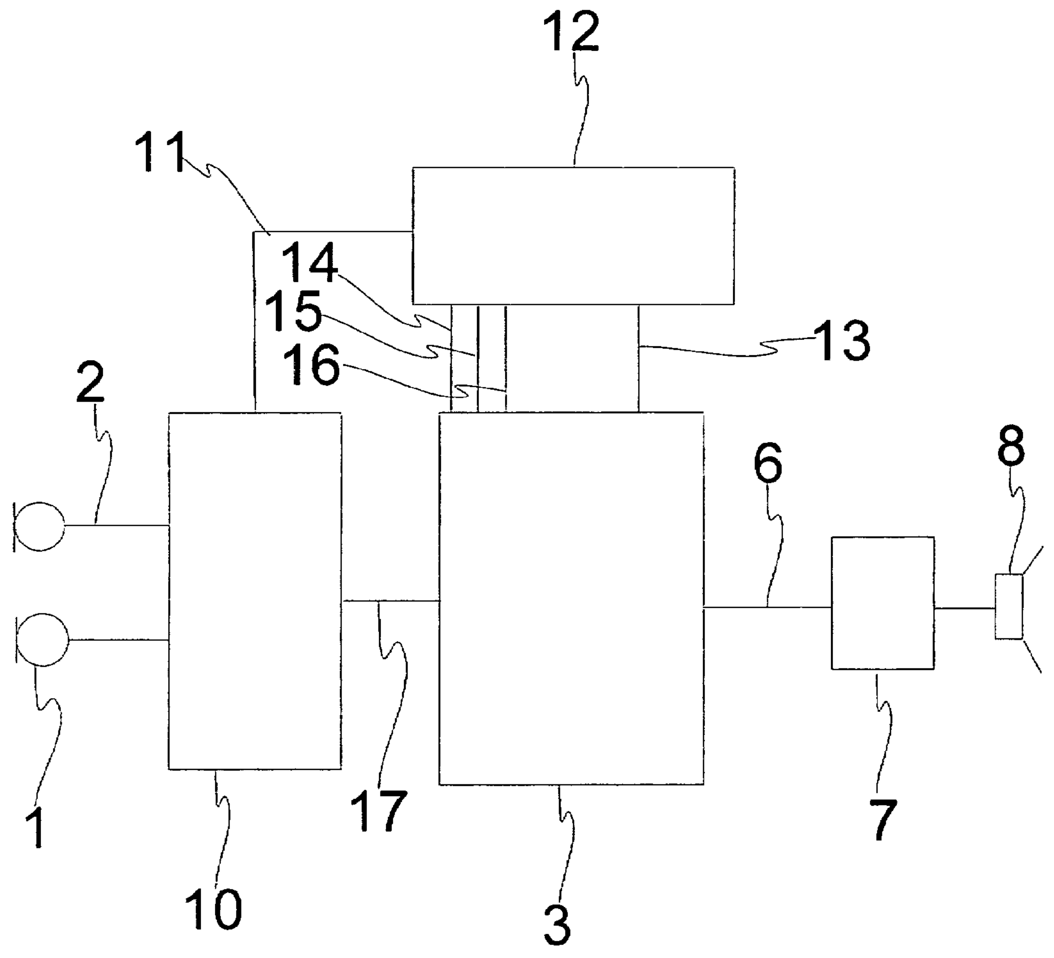
FIG. 3 shows a schematic diagram of a hearing aid according to a further aspect of the invention.

In FIG. 3 a further embodiment of the invention is schematically displayed. The decision regarding delay time is based on filterbank data as well as on data from the DSP. The DSP is capable of several levels of processing depending on the allowable delay. The unit performs two processing algorithms during transition from one to another type of algorithm. This is explained in detail in the following. The bloc 10 is a filterbank which will split the input signal 2 into a number of signals each representing a limited frequency span. These signals are transferred to a signal processing unit through a signal path 17 and also the signals are passed to a signal analysis unit 12 through a path 11. The analysis unit 12 further receives data 14, 15, 16 from the DSP unit 3, relating to the signal processing such as status of antifeedback, voice activity detection, music detection or other important features relating to the signal processing. Based on these data the analysis unit 12 determines which signal processing algorithm should be performed and feeds a signal 13 accordingly to the DSP unit 3. The unit 3 will perform the chosen algorithm until a new signal value 13 is presented. At most times the DSP 3 only performs one algorithm at a time.

When changing from one to another algorithm the same problems relating to signal alignment as mention above applies, and similar solutions can be performed in order to avoid artefacts. This will be performed in the DSP unit 3. When the DSP unit 3 is not in the act of changing from one algorithm to another only the algorithm resulting and the output signal 6 will be fully active. In this way power is saved. In order to deliver the status signals 14,15,16 the DSP unit may have to at least partially perform certain analysis on the signal 17. In FIG. 3 and the corresponding description above, the blocs 3, 12 and 10 are described as separate units, but the processes performed in each block may well be performed on the same IC device, and some of the displayed blocks like block 12 and block 3 may in the actual implementation be more or less integrated with one another.

The invention claimed is:

1. Method for processing audio signals, comprising:

capturing an audio signal;

digitizing the captured signal into an input signal;

processing the input signal in the digital domain by a digital signal processing unit, the processing including performing at least two processing algorithms on the input signal, determining a time delay of each of the at least two processing algorithms, assessing relative benefit of each of the at least two processing algorithms based on the determined time delays and needs of a particular user, and automatically selecting one of the at least two processing algorithms to generate a processed output signal based on a result of the assessing;

adapting the processed output signal from the digital signal processing unit to a transducer; and serving the adapted processed output signal at the transducer for providing a sensation of sound, wherein at least two different digital algorithms are available within the digital processing unit which delivers each their processed signal having each their non identical time delay.

2. Method as claimed in claim 1, further comprising:

initially analyzing the input signal; and making a choice based on results of the initially analyzing as to which algorithm and accompanying time delay should be performed, whereby an according decision signal from an analyse block is served at the digital signal processing unit in order to realize the chosen algorithm.

3. Method as claimed in claim 1 or 2, wherein a gradual fade between a current processed signal and a desired processed signal is performed.

4. Method as claimed in claim 1, further comprising:

providing a time alignment between a current processed signal and a desired processed signal by introducing a time delay in the processed signal having the smallest time delay of the two; and fading from a current signal to a desired signal.

5. Method as claimed in claim 3, wherein the time delay of the just chosen desired signal is reduced as much as possible.

6. An audio system, comprising:

an audio signal capturing unit configured to capture an audio signal;

a digitizing unit configured to digitize the audio signal into an input signal;

a digital signal processing unit for processing the input signal in the digital domain, the digital signal processing unit configured to perform at least two processing algorithms on the input signal, determine a time delay of each of the at least two processing algorithms, assess relative benefit of each of the at least two processing algorithms based on the determined time delays and needs of a particular user, and automatically select one of the at least two processing algorithms to generate a processed output signal based on a result of the assessment; and an output transducer where a processed output signal from the digital signal processing unit is adapted for the output transducer and served at the output transducer for providing a sensation of sound, wherein the digital signal processing unit is configured to perform at least two different digital algorithms which delivers each their processed signal having each their non identical time delay.

7. A hearing aid, comprising:

an audio signal capturing unit configured to capture an audio signal;

a digitizing unit configured to digitize the audio signal into an input signal;

a digital signal processing unit for processing the input signal in the digital domain, the digital signal processing unit configured to perform at least two processing algorithms on the input signal, determine a time delay of each of the at least two processing algorithms, assess relative benefit of each of the at least two processing algorithms based on the determined time delays and needs of a particular user, and automatically select one of the at least two processing algorithms to generate a processed output signal based on a result of the assessment; and an output transducer where a processed output signal from the digital signal processing unit is adapted for the output transducer and served at the output transducer for providing a sensation of sound, wherein the digital signal processing unit is configured to perform at least two different digital algorithms which delivers each their processed signal having each their non identical time delay.

8. The hearing aid as claimed in claim 7, further comprising:

a communication unit configured to communicate with one further hearing aid in order to assure that the hearing aid pair has essentially the same time delay during operation.

* * * * *